No. 123,082. Patented Jan. 30, 1872.

BURK and TRUSSEL's
IMPROVEMENTS
IN MODE OF BOLTING FLOUR.

Witnesses:
Clarence A. Ridgely
Ed. F. Gallaher

Burk and Trussel
By
their Agent & Attorney
John N. Gallaher Jr 123,082

UNITED STATES PATENT OFFICE.

JOHN H. BURK AND THOMAS W. TRUSSELL, OF NEW MARKET, VIRGINIA.

IMPROVEMENT IN BOLTING FLOUR.

Specification forming part of Letters Patent No. 123,082, dated January 30, 1872.

SPECIFICATION.

We, JOHN H. BURK and THOMAS W. TRUSSELL, of New Market, in the county of Shenandoah and State of Virginia, have jointly invented and made certain new and useful Improvements in the manner or mode of Bolting or Refining Flour, of which the following is a specification.

Our improvements relate to the manner of sifting or bolting the meal of wheat grain, so as to avoid sharp or close grinding, excessive comminution, and undue bolting, by not returning the once-bolted mass back into the cooling-room, to be mingled or remixed with unbolted meal and offal, nor to be mixed again with reground offal, but preserving intact the first-bolted product divested of all undue attrition, whereby all injurious frictional heating or scorching of the refined mass of flour is prevented. The mechanical devices employed in our mode, though not new in themselves, are limited in number, and arranged and used differently, somewhat, from other arrangements whereby the result sought ensues.

The nature of and the object connected with our improvements consist, first, in direct bolting or refining the meal of ground or reduced wheat, rye, or other glutinous as well as farinaceous grain, so as to produce a most superior grade or quality of flour-product, containing a much larger per centage of gluten in a given amount or quantity, and possessing a much more nutritious principle, than is possessed by flour made by other modes or processes. Secondly, and furthermore, our improvements enable the manufacturer of flour to produce from one to two more additional barrels of first-grade flour from one hundred bushels of grain, whilst, at the same time, this improved quality and increased quantity can be manufactured in much less time than by any other system now known of producing flour, thus greatly reducing labor and time; in a measure preventing wear of machinery, and facilitating the making of flour for market; all of which are material considerations to the manufacturer, dealer, and consumer. The several advantages of our improvements over all other modes known to us will be more fully set forth and explained hereinafter.

Figure 1:
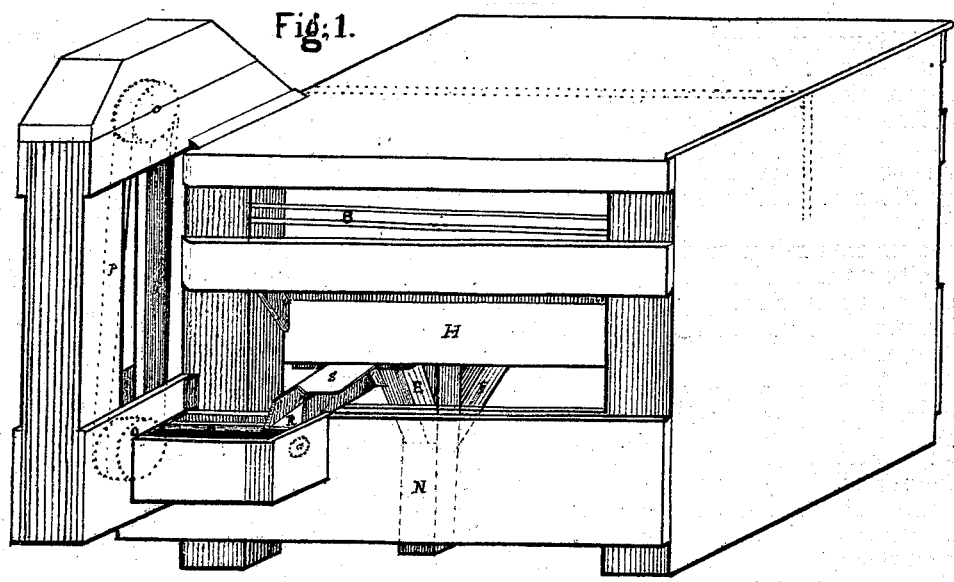
Figure 2:
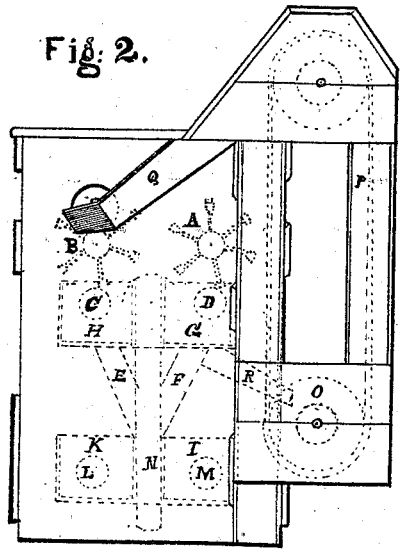

The accompanying diagram, Figure 1, is a geometrical perspective view; and Fig. 2 is an end elevation, with the interior parts of mechanism (dotted in) of our arrangement of bolting apparatus. In order more fully to show the difference between our improvements and other methods of making flour, we deem it necessary first to describe as nearly as possible the usual or ordinary mode of making flour, which consists, first, of conveying, in the well-known manner, the ground mass of meal direct from the grinding-burrs to bins or boxes into a cooling-room, which is generally located above the grinding and bolting apparatus, and, after being cooled as required, the ground meal is conveyed by conveyers and elevators to a series of four or more bolting-reels or refining-cloths, each reel and cloth being from ten to twelve feet, more or less, in length, arranged laterally and parallel to each other, and at a slight inclination from end to end. Revolving spiral conveyers, horizontally arranged and vertically-moving endless band-elevators, are also used. As hereinbefore stated, the cooled mass of meal is conveyed from the cooling-room by the well-known devices, and is deposited within the bolting-reels, which are generally covered throughout their whole length with one and the same grade of coarse or fine bolting-cloth, as may be required, and as is the case in most of the ordinary modes of bolting. The meal sifts through the cloth, the finer particles falling beneath the reel into proper receptacles, and the coarser particles issuing through and from the open end of the reel into other receptacles. In the ordinary mode of bolting the refined particles of flour that are deposited from the head part of the bolting-reel, and which flour is intended for packing, is delivered through down-spouts or outlets, indicated at E F, and the flour or residue in the reel, being cut off at the proper time from the upper conveyers, C D, passes out of the upper boxes, G H, Fig. 1, dots Fig. 2, the said boxes being provided underneath with suitable outlets, (not shown in diagram,) through which the flour falls into the lower boxes, I K, which are provided with spiral conveyers, L M, Fig. 2, indicated by dots. The portion of flour falling through about two-thirds the length of the lower conveyers L M, being nearly thoroughly bolted, is then conveyed back again to the cooling-room, there mixed or intermingled with the unbolted mass, when more or less of the said mixed mass is conveyed along down into and through the bolting-reels A B, and there rebolted. Thus in the ordinary modes a great portion of the flour is constantly being returned to the cooling-room, remixed and rebolted over and over, thereby impoverishing the flour and extracting the glutinous, nutritious principle.

We are aware that a patent for an alleged improved mode of bolting flour was granted to Benjamin D. Sanders, August 24, 1858, and to show a dissimilarity between said patented mode and ours we will endeavor to explain the difference. In the Sanders specification it is clearly recited that his process or mode requires the use of several bolting-reels, and that he "rebolts" the ground mass several times, whereby he alleges that he "deprives" superfine flour of "fine offal," or "specky" impurities, and on this said mode is based his first claim. The applicant in his second claim recites that he "restores" again to the "superfine flour that matter which he alleges in his first claim he "deprives" said superfine flour of. It seems that the Sanders process is confined to a "superfine" grade of flour, and in said process or mode the tailings are returned and rebolted with the flour already once bolted. In our mode, the whole mass of flour from first reel B is conveyed to second reel A without any return meal or flour. In the Sanders mode, a part of the bolted meal from his first reel is conveyed to his second reel, while another portion of the once-bolted mass is returned back to the same first reel, there again intermingled with additional offal and meal coming from the grinding-burrs through the cooling-room. We employ no such mode, as will be more fully hereinafter shown. By the Sanders mode a part only of the product from the second reel is considered as finished flour, suitable for packing or barreling. Furthermore, a part, also, of his second reel is returned for a rebolting, together with that conveyed from his first reel. Thus it appears that two or more different grades or qualities are in fact made from the several different reels he employs—one grade of better quality than the other, but both of which must necessarily be overbolted and thereby deprived of too much gluten, and, consequently, the flour is greatly impoverished and injured in its nutritious property. In the Sanders process it will be perceived that the very coarse meal which passes over the tail of his second reel is conveyed to the third reel, and the flour that sifts through the said third reel is returned to his second reel and there intermingled with the other flour, thereby subjecting the whole mass to minute offal specks because of the repeated return flour from three or more several reels.

The foregoing described processes or modes are what millers ordinarily term "bolting and rebolting with offal." In ordinary milling, four several grades or different qualities of wheat flour are manufactured, and designated, in order, as first, family; second, extra; third, fine; and fourth, superfine. Of family or best-grade flour from fifteen to eighteen barrels are produced from the grinding of one hundred bushels of grain. The residue product from the said amount of grain, being the first or richest offal or middlings running off from the tails of reels, is generally reground, when from two to three barrels of extra flour are produced. The middlings resulting from this second grinding and second bolting are again reground, when from one to two barrels of superfine are produced. Lastly, a final regrinding of all accumulated bolted and rebolted middlings or offal produces about one barrel of very low grade of thin, dead, and insipid flour. By our mode or method of bolting we make but two grades of flour, first and second qualities—i. e., "family," and "extra"—thereby producing about twenty-one barrels of "family"—the highest and best—and two barrels of superior "extra," the next best grade of flour, from the grinding of one hundred bushels of grain. When we grind wheat for "extra" flour we make no other grade thereof.

Our mechanical arrangement of devices consists in employing but two reels, making our reels sixteen feet in length, thus affording greater bolting surface. We cover the upper or head half of the length of each reel with a coarse-grade cloth, number 11, the fine-grade cloth, number 12, covering the tail-end half of the reels. Fine and coarse grades of bolting-cloth are commonly used, but, we believe, not in the precise manner as used by us.

It is deemed expedient to make the foregoing explanations and review other modes or methods of bolting and refining flour, so that the difference between them and ours may be more clearly shown and more readily understood.

The object generally sought after, it appears, in the many modes of manufacturing flour is principally to reduce the grain to the very finest condition or the most impalpable mass, losing sight entirely of the nutritious property, and destroying almost entirely the glutinous principle, both of which are the life and substance of the grain. This destructive process we effectually avoid, and it is one of the improved features of our mode of bolting flour.

The operation of our mode is as follows, viz.: The meal from the cooling-room is first conveyed to reel B; there bolted; the bolted product being conveyed thence, by the spout R, the ordinary spouts, E F N, being closed by a slide or shut-off, S, as shown in Fig. 1. The flour once bolted through reel B passes down to the pulley-wheel conveyer O; thence is carried upward by the endless-band elevator (P, Fig. 1; dots, Fig. 2;) and next emptied into the end-delivery spout Q above; thence falling into the second bolting-reel A, where the flour is again bolted, but without being first returned to the cooling room, and without being mixed or intermingled with the unbolted mass, as is done in the ordinary manner of bolting flour. The product thus bolted without any return we use and pack as finished "family" flour. The tailings resulting from the two reels B A we return to the grinding-burrs for a second grinding, the bolting of which produces the second-best grade of extra. Thus by avoiding repeated boltings the usual shortening or lessening of quantity of best grades is also thereby prevented, and thus we are enabled to produce a greater quantity of the best and next grades of "family," and "extra" flour from a given number of bushels of grain.

It must be very apparent that by our new mode of manufacturing we produce a highly nutritious and healthful grade or quality of "family" and "extra" flour by avoiding undue and excessive comminution of the film or husk of the grain, thus preventing what is termed "specky" flour. We avoid excessive attrition of the floury particles, so as to prevent an insipid or dead property; and we also avoid injurious frictional heating of the glutinous property of the flour, which heating more or less compacts the flour. Consequently among the improved results of our mode of manufacture is a pure, unmixed, rich flour, of a most uniformly-high grade, while the offal of shorts and bran resulting from our mode of bolting is of a much superior grade in point of quality and quantity than is usually produced in milling.

Having shown the mechanical appliances used in bolting flour, and described in detail the difference between the ordinary modes and our improved mode of manufacturing flour, what we claim as new, and desire to have secured by Letters Patent, is as follows, viz.:

1. We do not claim as new any of the devices or mechanical parts separately or apart; but we do claim the combination of the reels A B, conveyers C D L M with the central connecting-spouts E F N, the lateral spout R and shut-off S, conveyer O, elevator P, and the end-delivery spout Q, when arranged as described, to operate substantially in the manner and for the purpose set forth.

2. We also claim the herein-described mode of producing different grades of flour, substantially as set forth.

J. H. BURK. [L. S.]
    T. W. TRUSSELL. [L. S.]

Witnesses:
    D. F. KAGEY,
    A. K. GINN.